US010225251B2

United States Patent
Maple et al.

(10) Patent No.: US 10,225,251 B2
(45) Date of Patent: Mar. 5, 2019

(54) DYNAMIC, PROXIED RESET OF USER CREDENTIALS

(71) Applicant: CA, Inc., New York, NY (US)

(72) Inventors: Ryan W. Maple, Waldwick, NJ (US); John M. Suit, Mount Airy, MD (US); Mordecai B. Rosen, McLean, VA (US)

(73) Assignee: Ca, Inc., New York, NY (US)

(*) Notice: Subject to any disclaimer, the term of this patent is extended or adjusted under 35 U.S.C. 154(b) by 170 days.

(21) Appl. No.: 15/087,308

(22) Filed: Mar. 31, 2016

(65) Prior Publication Data

US 2017/0054723 A1 Feb. 23, 2017

Related U.S. Application Data

(60) Provisional application No. 62/205,840, filed on Aug. 17, 2015.

(51) Int. Cl.
*H04L 29/06* (2006.01)
*H04L 29/08* (2006.01)

(52) U.S. Cl.
CPC .............. *H04L 63/10* (2013.01); *H04L 63/08* (2013.01); *H04L 63/1425* (2013.01); *H04L 63/20* (2013.01); *H04L 67/141* (2013.01); *H04L 67/42* (2013.01)

(58) Field of Classification Search
CPC ................................ H04L 63/08; H04L 63/10
USPC ............................................................ 726/7
See application file for complete search history.

(56) References Cited

U.S. PATENT DOCUMENTS

2011/0282934 A1* 11/2011 Chalana ................. G06Q 10/06
709/203
2011/0313870 A1* 12/2011 Eicher .................... G06Q 20/20
705/16

\* cited by examiner

*Primary Examiner* — Anthony D Brown
(74) *Attorney, Agent, or Firm* — Baker Botts L.L.P.

(57) ABSTRACT

A method includes receiving, at a server, a request from a user to access an enterprise network system. The user is authenticated at the server, by receiving first unique credentials from the user. The user's access to a plurality of services external to the enterprise network system is facilitated, in response to receiving the first unique credentials from the user. Each of the plurality of services requires respective unique services credentials associated with the user, to access a respective unique account associated with the user. The method includes receiving, from the user, a selection of one of the plurality of services. The respective unique services credentials associated with the user are determined, for the selected one of the plurality of services. A connection between the server and the selected one of the plurality of services is established, using the respective unique services credentials associated with the user. The user is provided with access to the selected one of the plurality of services during a first session, through the connection between the server and the selected one of the plurality of services. The respective unique services credentials associated with the user are dynamically modified, after the first session is finished.

20 Claims, 4 Drawing Sheets

DYNAMIC, PROXIED RESET OF USER CREDENTIALS

CROSS-REFERENCE TO RELATED APPLICATIONS

This application claims the benefit, under 35 U.S.C. § 119(e), of U.S. Provisional Patent Application No. 62/205,840, filed Aug. 17, 2015, which is incorporated herein by reference.

BACKGROUND

The disclosure relates generally to proxied resource allocation, and more specifically to dynamic, proxied reset of user credentials.

BRIEF SUMMARY

According to one aspect of the present disclosure, a method includes receiving, at a server, a request from a user to access an enterprise network system. The user is authenticated at the server, by receiving first unique credentials from the user. The user's access to a plurality of services external to the enterprise network system is facilitated, in response to receiving the first unique credentials from the user. Each of the plurality of services requires respective unique services credentials associated with the user, to access a respective unique account associated with the user. The method includes receiving, from the user, a selection of one of the plurality of services. The respective unique services credentials associated with the user are determined, for the selected one of the plurality of services. A connection between the server and the selected one of the plurality of services is established, using the respective unique services credentials associated with the user. The user is provided with access to the selected one of the plurality of services during a first session, through the connection between the server and the selected one of the plurality of services. The respective unique services credentials associated with the user are dynamically modified, after the first session is finished.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
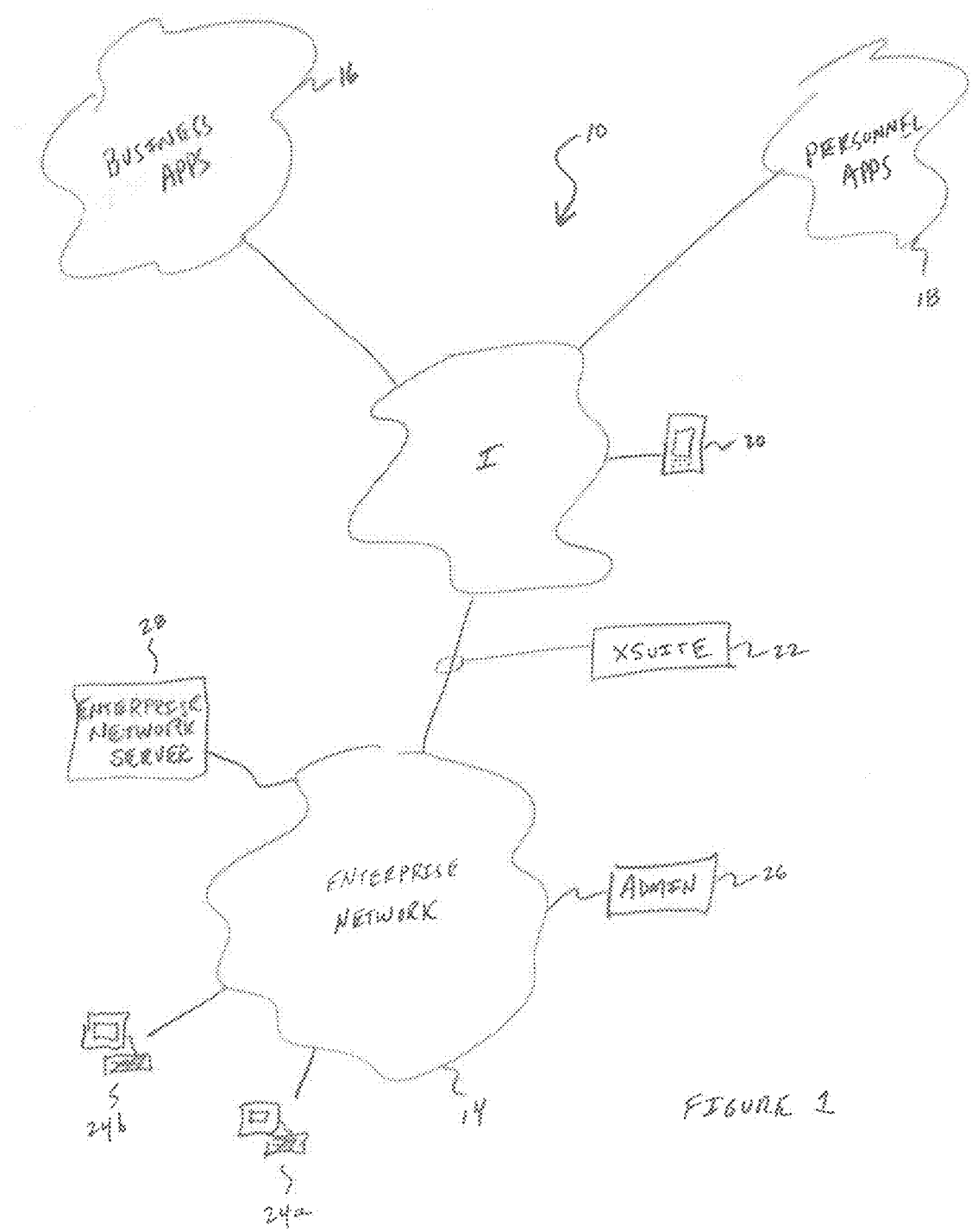
FIG. 1 illustrates a high-level block diagram of a system for dynamic, proxied reset of login credentials, in accordance with a particular embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In accordance with the teachings of the present disclosure, a system may be provided that allows for dynamic, proxied resource allocation and prescribed action of public and private, internal and external, virtual, cloud and enterprise resources. Particular embodiments and their advantages are best understood by reference to FIGS. 1 through 4, wherein like numbers are used to indicate like and corresponding parts.

FIG. 1 is a block diagram depicting a network 10 for dynamic, proxied resource allocation, in accordance with the teachings of the present disclosure. Network 10 may include, for example, a public network (e.g., the Internet) 12 coupled for communication with an enterprise network 14, a professional service network 16 and a personal service network 18. Public network 12 is also coupled for communication with a mobile device 20 and a proxy server 22 that embodies aspects of the present disclosure.

Enterprise network 14 may comprise, for example, the hardware, software and services utilized by a particular enterprise to conduct its business operations. For example, each of the resources of enterprise network 14 may reside behind a firewall governed by or on behalf of the particular enterprise. In the illustrated embodiment, such resources of enterprise network 14 include a plurality of terminal devices (two of which are labeled 24a and 24b), an administrator terminal 26 and an enterprise network server 28.

Each network, device, server, device and terminal illustrated in FIG. 1 may be configured to function as the node of communication network 10. For example, each such node may include a server (e.g., blade server or rack server), personal computer (e.g., desktop or laptop), tablet computer, mobile device (e.g., personal digital assistant (PDA) or smart phone), network storage device, printer, switch, router, data collection device, virtual machine, script, executable, firmware, library, shared library, function, module, software application, or any other suitable device or application. Furthermore, each such node may include one or more resources, such as a processor, memory, peripheral, application, datastore, storage, function, card, board, or other physical or virtual device. Resources of nodes may further include data transmission bandwidth, network connectivity, or any other components or functionality. Although each network of FIG. 1 is illustrated as including a particular number of nodes, any such network or system may include more than or fewer than the number of nodes illustrated. Similarly, although network 10 is shown in FIG. 1 as including nodes of particular types illustrated and described, a system may include nodes of types other than those shown in FIG. 1.

Network 10 may include a network and/or fabric configured to communicatively couple any node associated with network 10. Any network, server and/or device of network 10 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system configured to facilitate the communication of signals, data and/or messages (generally referred to as data). Network 120 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof. Networks 14, 16 and 18 are typically implemented as local area networks, but may be implemented as or part of any type of network.

Each node of network 10 may be disposed to host computer applications. For example, one or more nodes may be disposed to host enterprise applications, including, but not limited to, internet web page hosting, internet based applications, database applications, e-commerce applications, or any other suitable application or combination of applications. Users of such applications may access nodes disposed for hosting the application by using, for example, networks 12, 14, 16 or 18.

An operator of administrator terminal 26 (i.e., the administrator) may control the functionality and operation of enterprise network 14. For example, the administrator can configure terminal devices 24a and 24b to control the resources available to users of such terminals. The resources available to such users may include resources internal to the enterprise, for example at enterprise network server 28. Thus, any proprietary information or sensitive resources of the enterprise can be controlled and monitored by the administrator to control access to information, features and functions of any resources internal to the enterprise.

Thus, a user, for example an employee, of terminal device 24a may be given login credentials to allow the employee to access terminal device 24a. The employee may also be given login credentials that allow the employee to access any resources or services within the enterprise network. Such login may be the same, or in addition to the login credential used to access terminal device 24a. As described in more detail below, the administrator may automatically configure any particular terminal device according to a certain "role" within the organization so that employees of similar job titles or functions will be assigned a "template" configuration appropriate for that title, function or role. This allows the administrator to add or amend roles that are automatically rolled out to all employees or users that fall within that role.

Employees may also have access to the Internet 12, which makes available an infinite number of external resources and services. For example, the enterprise may want its employees to use certain resources available through public network 12 on behalf of the enterprise. In the illustrated embodiment, employees have access to professional service network 16. In particular embodiments, business applications such as salesforce.com may be a service that is available through a professional service network. Others may include research, timekeeping, CRM and any other business application that the enterprise would like to make available to its employees.

Employees may also have access to personal services network 18. In the illustrated embodiment, personal services network 18 provides access to the Gmail application. Other personal services that may be made available over the Internet include Facebook, Twitter, other social media, news, entertainment, and any other resource the employees may use for their personal benefit or entertainment. For purposes of this specification, the distinction between professional services and personal services is simply to indicate those services that the employee is likely to access within the employees job function (e.g., business applications) and those services that the employee is more likely to access outside of the employees job function (e.g., surfing the web, social media, etc.).

Proxy server 22 embodies aspects of the present disclosure, and allows the enterprise to control its employees access to any resources and/or services that are available to the employee, whether the resources and/or services are internal or external to the enterprise, public or private, etc. In the illustrated embodiment, proxy server 22 is illustrated as external to the enterprise, but it will be appreciated by those of ordinary skill in the art that proxy server 22 could be located internal to the enterprise in particular embodiments. As will be described in more detail below, the proxy server may be used to carefully control, monitor, record and/or audit any particular "sessions" during which an employee attempts to gain or gains access to services available throughout network 10.

Figure 2:
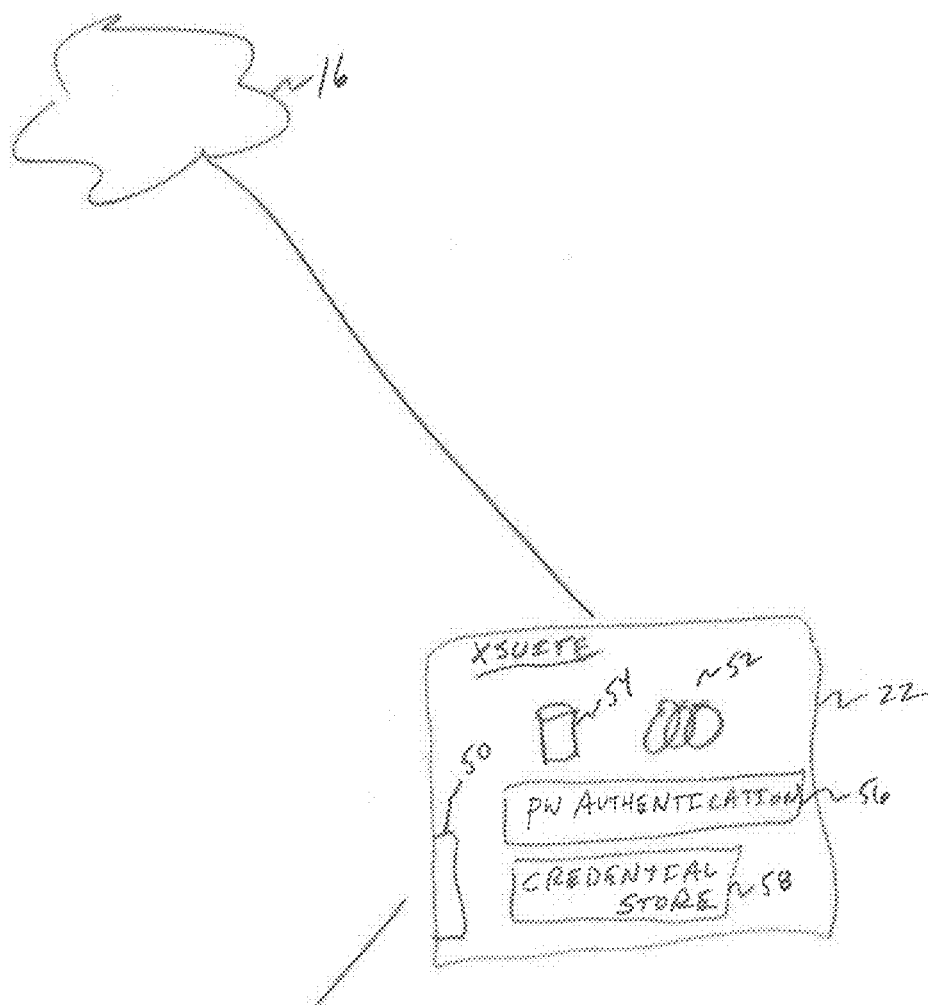
FIG. 2 illustrates a proxy server of FIG. 1, in more detail, in accordance with a particular embodiment of the present disclosure.
Figure 2:
Figure 3:
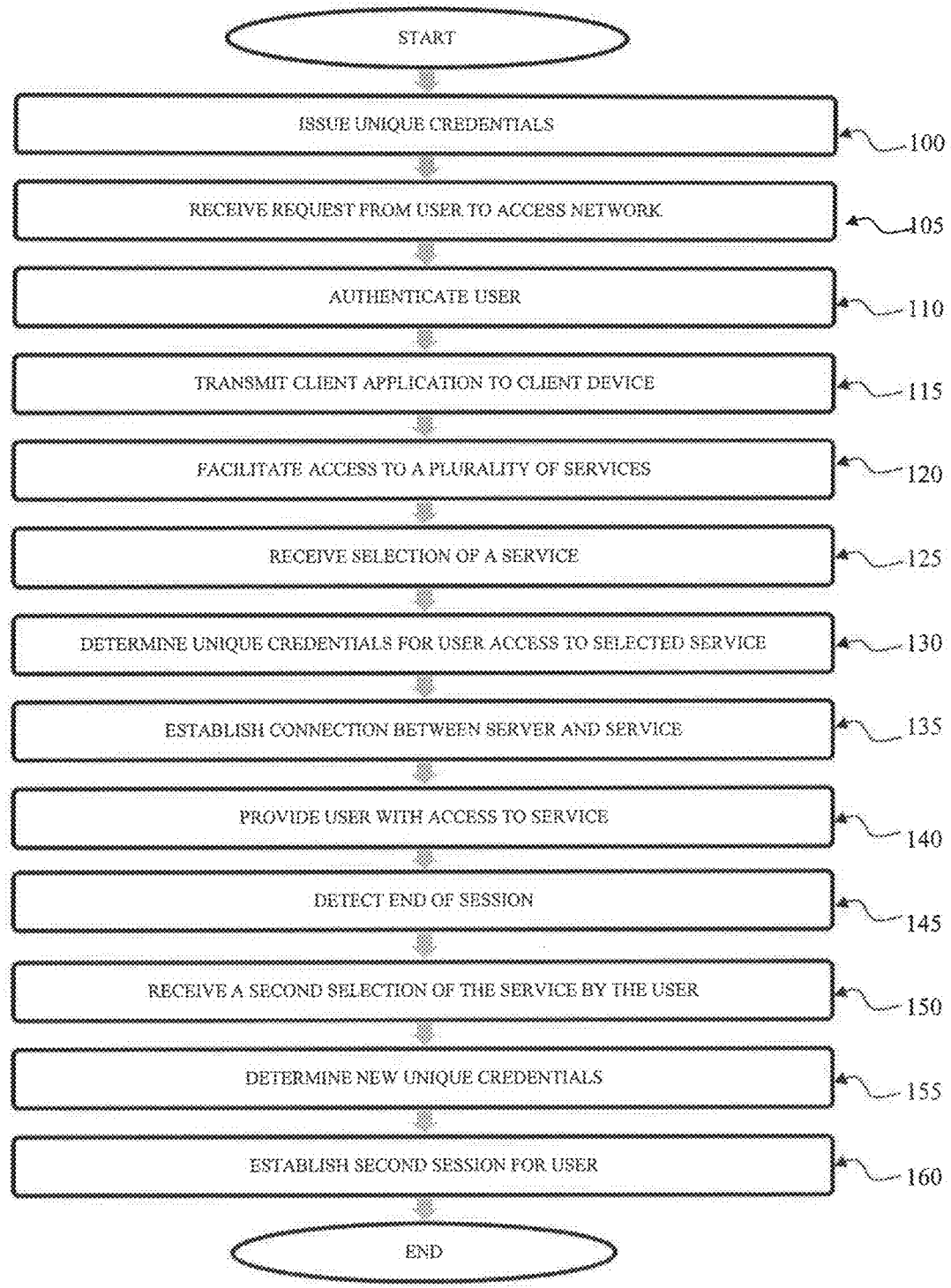
FIG. 3 illustrates a flow chart of a method for dynamic, proxied reset of user credentials, in accordance with a particular embodiment of the present disclosure.
Figure 4:
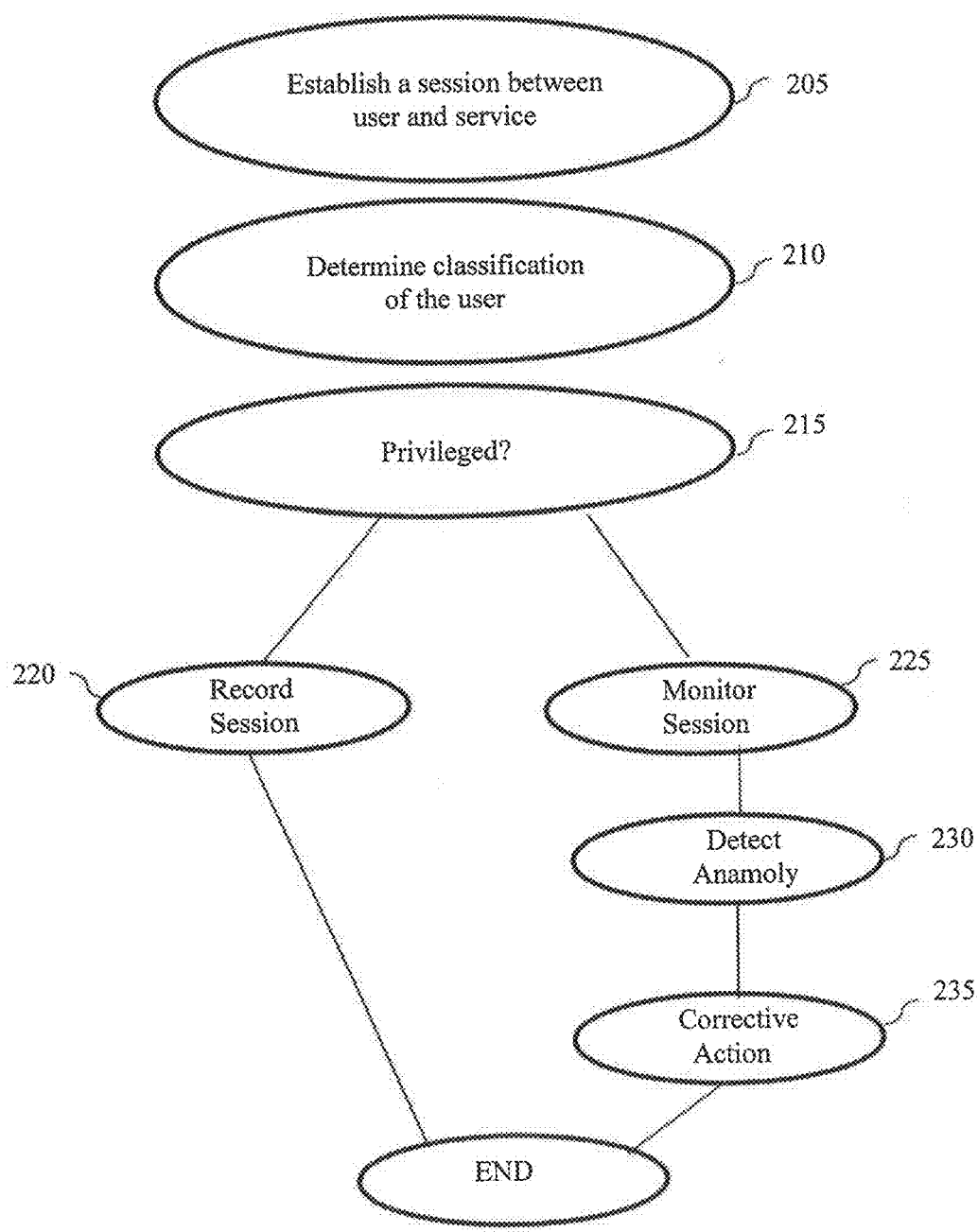
FIG. 4 illustrates a flow chart of a method for monitoring or recording sessions, in accordance with a particular embodiment of the present disclosure.

FIG. 2 illustrates certain components of server 22, in more detail. As described above, server 22 acts as a proxy on behalf of a user 24a within an enterprise, when such user seeks access to services available through a network, for example business applications available through professional services network 16. Server 22 includes an interface 50 that allows for communication with user 24a. Server 22 also includes processors 52 and memory 54 to accomplish the functionality described herein. For example, user 24a authenticates with server 22 through the use of server 22 password authentication module 56. Password authentication module 56 allows server 22 to verify that user 24a is an authorized user of enterprise network 14 and/or server 22. Server 22 also has a credential store 58 in which credentials of all users of enterprise network 14 (e.g., employees) are stored, to allow server 22 to access services of network 16 on behalf of (e.g., as a proxy for) user 24a. Credential store 58 also allows server 22 to track new credentials on behalf of user 24a as they are reset and/or amended, pursuant to the teachings herein.

The method begins at step 100 where unique credentials are issued to a user. For example, the unique credentials may be issued to a user of enterprise network system 20, for example by an employer of the user/employee. The unique credentials may take the form of any type of credentials utilized by enterprises. For example, a user may have a unique username, and a password. In other embodiments unique credentials may take the form of biometrics or other unique authentication schemes in use today.

In accordance with a particular embodiment of this disclosure, the unique credentials of the user will be identical to those that the user is issued by the administrator of the enterprise, for example the users employer. In another embodiment, a server used to accomplish aspects of this invention may issue new unique credentials to the user to facilitate authentication with a particular server and those credentials may differ from those issued to the user from the administrator of the enterprise.

At step 105 a request is received from the user to access the enterprise network. This request may be from the user simply to logon to a particular client device associated with the user (e.g., laptop or desktop), it may be a request for the user to access resources of the enterprise (e.g., internal resources), or it may be a specific request to access one or more resources external to the enterprise.

At step 110 the user is authenticated to the network or the particular server using the unique credentials associated with the user. This authentication step is similar to those used by many or most enterprise network administrators and employers today, to allow employees access to network resources of the enterprise.

At step 115, a client application is optionally transmitted to a client device associated with the user. For example the client application may be transmitted to the client device that the user is using to access the network. This step is optional because there are many ways to deliver the client application and it may be preinstalled by the enterprise or otherwise present on the users device. This client application allows for certain unique features associated with aspects of the disclosure to be accomplished at the client device.

Once the user is authenticated to the server, the server facilitates the user's access to a plurality of services at step 120. The services may be internal or external to the enterprise, and the services may be owned, operated and/or facilitated by the enterprise or a third-party. In accordance with particular embodiments of this disclosure, it is envisioned that many of the services would be publicly available through the Internet or "cloud". Many of the services will facilitate the user's access to resources that benefit the enterprise, for example salesforce.com. Many of the services may also facilitate the user's access to publicly available services for private (e.g., personal) use of the user, for example Facebook or Gmail.

The server facilitates the user's access to a plurality of public and private services using a single sign-on of unique credentials from the user. In other words, the user need only authenticate with a single server using one set of sign on credentials, in order to gain access to some or all of the services (e.g., websites, servers, etc.) available to the server, which acts as a proxy for the user to facilitate those services. This simplifies access to the system and enterprise resources for the user. For example, in a particular embodiment of the present disclosure, a simplified graphical user interface may be presented to the user that illustrates for the user each of the services that are available to the user through the enterprise and/or through the server. The services, both public and private, and both internal and external to the enterprise that are available to any particular user may be predetermined by particular policies and roles assigned to the user or plurality of users. This allows an administrator of the enterprise to carefully control not only the particular services that are available to any particular user, group of users, or roles within the organization, but also allows the administrator to carefully control particular activities, commands, and actions that a user may or may not take during any particular session with any particular service.

At step 125, a selection of a particular service is received from the user. For example the user may select a service from the previously mentioned graphical user interface. The service may be public or private, and may be internal or external to the enterprise, and may be available through a public cloud, private cloud or hybrid cloud offering.

Next, at step 130, the server determines unique credentials for the selected service that are associated with a particular user. For example, each service that is available to a user typically requires unique credentials associated with the user, for sign in and/or access to certain features and functions. For example the user may require unique credentials to log onto salesforce.com that are different from credentials required of the user to log onto Gmail or Facebook. In accordance with the present disclosure, the server acts as a single repository for each of the credentials for each of the users within the enterprise. This, in part, is what facilitates single sign-on from the user to the server, while the server is able to provide access to the user to a plurality of services, using the single sign-on unique credentials received from the user.

At step 135, a connection is established between the server and the service selected by the user. The server establishes the connection with the service using the respective unique credentials that associate the user with the particular service. These credentials are different than the unique credentials that the user employs to authenticate with the server. The communication connection between the server and the service allow the server to accomplish many functions on behalf of, or as a proxy for, the user. It also allows the server to control the user's access to the service. For example, the server has the ability to reset the user's access credentials (including a unique password), and/or configure the user's account in order to control which features and functions of the service are available to the user, and which actions or activities the use can engage in. These "settings" are often determined based upon the user's role within an organization. For example, an employer can configure each employees access by putting them into groups or roles that are based upon the user's title or level within an organization, or pre-approved activities appropriate for a particular user or group of users.

Next, at step 140, the server provides the user with access to the service. In this regard, the server acts as a proxy on behalf of the user. The server is therefore an intermediary between the user and the service such that certain, most, or all communications between the user and the service are directed through, and/or controlled by, the server.

In particular embodiments, the interaction between the user and the service may be referred to as a session. A session may take many forms but typically involves one transaction or one relatively continuous interaction between the user and the service for a period of time. The beginning of the session may be considered the initial communication between the user and the service (e.g., a new, unique sign-on). The end of the session may be detected in one or more of several different ways. For example, where a particular transaction or a number of transactions are involved, the end of the session may be considered the end of the transaction or transactions. In one embodiment the transaction between the user and the service may be considered complete and the session ended when the user indicates to the service that the transaction is complete. In another embodiment, the session may be considered complete after a particular amount of time with no interaction and no input from the user (time-out).

At step 145, the server detects the end of the session. The server may detect the end of the session in accordance with any of the examples discussed above, or others. In accordance with the teachings of the present disclosure, after the session is terminated, completed, or otherwise ended, the unique credentials associating the user with the particular service may be dynamically modified by the server. In a particular embodiment, dynamically modifying the credentials of the user may include immediately deleting the respective unique credentials used to access the service on behalf of the user. In other embodiments, the unique credentials associated with the user that were used to access the service may be immediately replaced with new such credentials. In order to accomplish this, the server interacts with the service in order to obtain new credentials and\or change the unique credentials associated with the by the service, at a server associated with the service. For example, replacing the credentials with new credentials may comprise changing a password, but keeping the same username associated with the user.

In another embodiment, the unique credentials associated with the user that were used to access the service on behalf of the user may be changed only after a point in time when the user requests access to the service for another, new session. This request for a new session may cause the server to automatically change or register new unique credentials associating the user with the service, and\or a server associated with the service.

At step 150, a second selection of the service is received from the user. This second selection from the user indicates that the user would like to engage in a second session with the service. In a particular embodiment, the server will not use the unique credentials associating the user with the service that were used for the first session, to instantiate the second session. This is in order to ensure that any third-party that may have intercepted the unique credentials before or during the first session may not use these credentials to establish a second session on behalf of the user.

Therefore, at step 155, the server determines new unique credentials for the user to access the server. The new unique credentials may include a user name from the prior unique credentials, but will require a new password or other unique input entry in order to identify the user and authenticate the user.

At step 160, the server establishes a second session on behalf of the user. This allows the user to engage in a second connection, communication session, and\or transaction with the service, without the user having to use a second set of credentials different from the unique credentials used to establish the first communication session between the user and the service. Moreover, the user is unaware that a second set of unique credentials was used on behalf of the user because the actions of the server to detect the end of the first session and reset and\or obtain new unique credentials that associate the user with the service are entirely transparent to the user.

At step 165, the method ends. However, the teachings disclosed herein may be used for any number of transactions between the user and the server, and/or the user and the service. For example for any and number of sessions between the user and the service, the server may reset and/or obtain new credentials on the half of the user N−1 times. Thus, for each session, a new and different set of unique credentials associating the user to the service are used by the server to establish the communication session between the user and the service.

Figure X illustrates a method for monitoring, recording, and/or auditing sessions between users and services that are available for use by such users. For example at step 205, a session is established between a user and a service. The session may be established in accordance with those examples described herein, or many others available to establish sessions. The session may be any type of communication during which a user is utilizing a resource of a communication network, including those described above.

Next, at step 210, the server determines the classification of the user. The classification of the user may be assigned by the administrator and/or automatically assigned to the user based upon the user's role within the organization (title, classification, location, department, responsibility, etc.). Many different classifications may be applied to users within any organization or enterprise. For example, certain users may be characterized as privileged users. Privileged users typically denote those users who have some authority to access sensitive information and\or engage in sensitive activity using the network. For example sensitive activity may include being able to configure certain services, grant or deny access to certain services, etc. Typically, executives of an enterprise with certain levels of authority are considered privileged users. Similarly, administrators of the network and those with significant or substantial permissions to engage in activity using the network are considered privileged.

Nonprivileged users are often considered those employees or members of the enterprise that can use a service but are generally shielded from the most sensitive information and prevented from engaging in any sensitive activities. Various levels of classification of users or employees are typically employed by an enterprise. Often times these classifications are correlated to certain positions or titles that are defined within the enterprise (e.g., roles). Each classification will determine what the user may or may not access, may or may not do during a session and/or whether or not the user may use a particular service or establish a particular session.

One example of different classifications and permissions may include the following: An employee that is a nonprivileged user may be able to access salesforce.com in order to enter information specific to that users account. A more privileged user may have access to records and accounts of multiple employees, for example a manager may have access to the records of all employees within that manager's organization. An even more privileged user may have permissions that allow that user to establish new accounts on behalf of new employees and/or delete accounts associated with departed employees.

Accordingly, at step 215, the server determines whether or not the classification of the user is privileged. For this example, it is assumed that only two classifications exist, being privileged or non-privileged. However, it will be recognized that any number of different classifications may be used and the actions of the server may be dictated by any of those specific classifications. In this example, a privileged user may be one that has a high level of authority to add, amend, alter and/or utilize the resources and or services of the enterprise. In alternative embodiments, privilege may be determined based upon the type of session, or the resource and/or the activity that the user is engaging in or would like to engage in. If it is determined that a classification of the user, session, resource and/or activity is privileged, then the session is recorded at step 220 until it is complete, and the method ends.

In other embodiments the recording may continue only until a certain action or activity is detected. The reason that the session is recorded when the user classification is privileged, is to allow for future auditing of the activities engaged in by the privilege user. For the reasons discussed above, a privilege user has greater access to sensitive information and sensitive activities, and therefore enhances the likelihood that a future audit will need complete details of the session between the user and the service. Thus, in many examples the entire session is recorded and stored permanently for at least some period of time for future auditing purposes.

If, however it is determined that a classification of the user, session, resource and/or activity is not privileged, then the session is monitored at step 225. Typically, the monitoring would continue until the session is complete. However, monitoring could be conducted for a shorter period of time until it is determined that further monitoring is not likely necessary (e.g., based upon the interaction of the user and the resource during the session). Alternatively, the monitoring may be cut short if and when an anomaly is detected at step 230.

Monitoring a session can take many forms. Typically, monitoring a session includes keeping track of certain actions or activities without recording the entirety of the session. In some instances none of the session is recorded until or unless some action or activity is detected. In this manner, monitoring the session allows for the detection of certain anomalies involved in the transaction between the user and the service, without recording the session. Monitoring as opposed to recording has many advantages, for example a substantially fewer number and amount of resources are required to monitor a section than are required to record a session.

In accordance with a particular embodiment, the monitoring of the session may be conducted by a client device associated with the user, for example the computing device that the user uses to conduct the session. The client device, for example, may have an application installed that can communicate with the server. Thus the server can instruct the application to monitor the session to attempt to detect one or more anomalies. When an anomaly is detected, the client may notify the server of the anomaly which will allow the server to take corrective action. The corrective action may include terminating the session, or may include beginning to record the session to ensure a future audit will allow full information of any transaction that occurred after the anomaly was detected.

Traditional enterprise networks may include various nodes that contribute to an overall business process. The network nodes may include both physical and cloud based machines. Enterprise networks may include cloud computing machines and physical hosts, which are required to provide an allocation of resources.

Enterprise networks may also include cloud resources/machines and physical host devices, which are required to provide an allocation of resources. Physical hosts may include hardware devices that provide certain services, such as physical storage, which may be converted to cloud storage and allocated to corresponding cloud machines or cloud spaces (e.g., virtual cloud machines) depending on the anticipated requirements of an observed use of such cloud functions. The balance between actual physical storage and physical processing and allocated cloud storage and cloud processing usage may be optimized by monitoring and identifying the activities and functions performed in the enterprise network environment. While both Cloud and Virtual infrastructure manages and maintains the execution of the underlying infrastructure, it is incumbent on the consumer or operator to allocate the resources provided by the Cloud or Virtual infrastructure. This allocation may be created or modified by the consumer/Customer at will by the use of a Cloud or Virtual Management Providers administrators console or though a Cloud or Virtual Infrastructure providers Application Interface or API. This API will be utilized to create, modify, or remove allocation from Cloud or Virtualization Service provider's infrastructure.

Using Amazon's Application Interface as an example of an embodiment of the present disclosure, the Awsapiproxy (xxxx) can record and audit access to the Amazon Web Services (AWS) REST/Query API's, which are used by tools such as the newly released AWS Command Line Interface (CLI).

Customers/end-users point their tools at new endpoints and use their awsapiproxy username and password for authentication. The syntax that is used to instantiate aspects of the present disclosure is included below, for purposes of example only.

awsapiproxy validates then re-submits requests to AWS, unchanged except for the AUTHPARAMS. Responses and errors are returned directly back to the end-user and a detailed audit log is send to Splunk (or Splunk Storm) via the Universal Forwarder.

awsapiproxy actively manages a cache of ephemeral credentials obtained via the IAM Security Token Service (STS). Temporary credentials are created on-the-fly for each end-user, bound to the IAM User policy configured in awsapiproxy.

Sample AWS CLI Invocation:
Endpoint=<service>.<region>.awsapiproxy.com (ie, ec2.us-west-2.awsapiproxy.com)
Access Key=Username, Secret Access Key=Password
$ aws -region us-east-1 -endpoint-url http://ec2.us-east-1.awsapiproxy.com/ec2 describe-instances The three main objects in awsapiproxy are customers, users, and policies. Customers consist of users, who each have a reference to a JSON-encoded IAM User policy defined within awsapiproxy.

Each customer has a "master" set of credentials [in the credential store of the Server—i.e., Xsuite] that are rotated (hourly, by default, per session) by the Manager Instance. These master credentials are to an IAM User with sufficient permissions (ie, to GetFederationToken)

To get set up in the system, create an IAM User then send the Username, Access Key, and Secret Access Key. Then set your endpoints to <service>.<region.awsapiproxy.com and your Access/Secret Access Keys to the username/password provided.

One potential use of the teachings of the present disclosure include an enterprise migrating to a cloud environment. Determining the enterprise functions that permit cloud migration requires an audit of those devices that would be accessed once the devices are present in the cloud infrastructure. This is accomplished by the server. The server brokers a user's access by way of a proxied authentication to the system and connects and authorizes the user to the target device on the users behalf. This activity, including a recording of the actual session is logged and available for audit. The aggregation of this artifacts (recordings, logs, etc.) are suitable for determining an inventory and future policy for migrating devices to a cloud infrastructure that would be a suitable equivalent in the cloud infrastructure. As devices are made available in the cloud through industry standard practices such as physical to virtual migration. The system and broker the users sessions to those devices based on the same policy but with a new device location.

The device may be a computer, laptop, mobile, wireless or cellular phone, a PDA, a tablet, a client a server or any device that contains a processor and/or memory, whether or not that processor or memory performs a function related to an embodiment of the invention. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

The teachings of the present disclosure, in accordance with another embodiment, controls access for privileged and remote users by providing controlled access to specific systems, applications and accounts through its unique access control and password management capabilities. The Access Control module (e.g., server 22) provisions and enforces access to specific protocols on a target device.

This may be accomplished using a secure port forwarder. This is a Java application that may be downloaded automatically when a user connects to an access page of the server, that routes the user's connection to a given target device through a TLS tunnel between the user's desktop and the server. The tunnel is setup by the user's access the system access page, where a Java Application is download and a TLS Tunnel is then established to the systems 443 Port, for example, from the users client machine. The Java app may be referred to as the UP or Universal Port forwarder. In particular embodiments, capabilities of the access control module (e.g., server 22), may include:

Enforced Access Users can access only those target devices for which access policy has been provisioned. Provisioning is determined by a policy that maps users, to target devices with specific policy attributes like, recording or not, type, like ssh, rdp, web, and what groups should inherent this policy mapping. That policy can specify the specific access methods or protocols that can be used to access the device. For example, a user can access 102.234.321.123 via RDP, 24 hours a day, with graphical recording and the socket filtered enabled to restrict the user to only that device.

Session auditing audit logs may be used to capture key information about user activity with attribution to the specific user regardless of which account they used to access the target device. The system will log the time, type, duration, destination, events, and policy violations for all user activity. This is recorded and persisted on the device and may be directed elsewhere by changing the configuration in the user interface.

Session Recording Command line sessions (e.g. SSH, telnet) may bee recorded as text files RDP, VNC and Web Portal sessions may be recorded graphically. The system records the files to a point designated in the UI; these include CIFS, and NFC, as well as Amazon AWS S3 mount points. The format is proprietary to the system and may only be viewed by a user using the system. A recording viewer plays back sessions may be provided via DVR-like controls. An example would be a video like recording with controls for start, stop, fast forward, and rewarding.

Command Filtering Flexible command filter policies can be defined to prevent users from entering specific commands during a command line session (blacklist) or to ensure users only execute commands from an allowed set (whitelist). These are defined within the UI Policy configuration menu and allow for a white list or black list of commands that may be entered into the system. An example would be when a user access a target system via an SSH session and the user will be restricted to only commands like "start", "LS", "stop" etc. As opposed to any and all commands. Detection of commands other than those on the white list may be an anomaly that requires corrective action, as described above.

Socket filtering in conjunction with a socket filter agent installed on target devices (e.g., automatically when the user logs on, for example), socket filter policies can be defined to allow users who have accessed a given device to only access specific servers from that device (whitelist) or deny access to specific servers from that device (blacklist). The socket filter agent is an application later application placed on the target system that allow communication from the users brokered session to reach the target system, if the agent is then removed or rendered unusable no communication will be possible. In this way, the agent cannot be disabled and still have communications take place between a user and a target system. This capability is referred to as leapfrog prevention. When accessing a Windows target device from a Windows 7 or later desktop, socket filtering is supported only for access initiated by the application that was downloaded to the user's device. An example is a user opens an SSH session using the system supplied Midterm app. The same would also be utilizing the system supplied RDP app being used to access that same Windows system. In this example the session is brokered through the system's access page.

The teachings of this disclosure support interfaces to a variety of authentication and authorization mechanisms. These include SAML, RSA, RSA+Radius, Radius, AD, LDAP, PIV, CAC Smartcard technologies, as well as others. These authentication mechanisms are used to authenticate the user to the system, where the system will then allow for syncing and revocation with 3rd party directory services to determine if the user is in fact allowed current access to the target systems that Xsuite brokers access for.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for access control, comprising:
   receiving, at a server, a request from a user to access an enterprise network system;
   authenticating the user at the server, by receiving first unique credentials from the user;
   facilitating the user's access to a plurality of services external to the enterprise network system, in response to receiving the first unique credentials from the user, wherein each of the plurality of services requires respective unique services credentials associated with the user, to access a respective unique account associated with the user;
   receiving, from the user, a selection of one of the plurality of services;
   determining the respective unique services credentials associated with the user, for the selected one of the plurality of services;
   establishing a connection between the server and the selected one of the plurality of services, using the respective unique services credentials associated with the user;
   providing the user with access to the selected one of the plurality of services during a first session, through the connection between the server and the selected one of the plurality of services; and
   dynamically modifying the respective unique services credentials associated with the user, after the first session is finished.

2. The method of claim 1, further comprising, prior to receiving the request from the user to access the enterprise network system, issuing the first unique credentials to the user.

3. The method of claim 1, further comprising transmitting a client application from the server to a client device associated with the user, wherein the client application is used by the server to control the client device, during the session.

4. The method of claim 1, wherein dynamically modifying the respective unique services credentials associated with the user comprises modifying the respective unique services credentials associated with the user prior to terminating the connection between the server and the selected one of the plurality of services.

5. The method of claim 1, wherein dynamically modifying the respective unique services credentials associated with the user comprises modifying the respective unique services credentials associated with the user periodically, according to a predetermined period of time.

6. The method of claim 1, wherein dynamically modifying the respective unique services credentials associated with the user comprises requesting, by the server, new respective unique services credentials associated with the user.

7. The method of claim 1, wherein dynamically modifying the respective unique credentials associated with the user comprises modifying, from the server, the respective unique services credentials to establish new respective unique services credentials associated with the user.

8. The method of claim 1, wherein dynamically modifying the respective unique credentials associated with the user comprises determining new respective unique credentials associated with the user and further comprising:
receiving, from the user, a second selection of the one of the plurality of services;
establishing a second connection between the server and the selected one of the plurality of services, using the new respective unique services credentials associated with the user;
providing the user with access to the selected one of the plurality of services during a second session, through the second connection between the server and the selected one of the plurality of services; and
dynamically modifying the new respective unique services credentials associated with the user, after the second session is finished.

9. A computer configured to access a storage device, the computer comprising:
a processor; and
a non-transitory, computer-readable storage medium storing computer-readable instructions that when executed by the processor cause the computer to perform:
receiving, at a server, a request from a user to access an enterprise network system;
authenticating the user at the server, by receiving first unique credentials from the user;
facilitating the user's access to a plurality of services external to the enterprise network system, in response to receiving the first unique credentials from the user, wherein each of the plurality of services requires respective unique services credentials associated with the user, to access a respective unique account associated with the user;
receiving, from the user, a selection of one of the plurality of services;
determining the respective unique services credentials associated with the user, for the selected one of the plurality of services;
establishing a connection between the server and the selected one of the plurality of services, using the respective unique services credentials associated with the user;
providing the user with access to the selected one of the plurality of services during a first session, through the connection between the server and the selected one of the plurality of services; and
dynamically modifying the respective unique services credentials associated with the user, after the first session is finished.

10. The computer of claim 9, wherein the computer-readable instructions further cause the computer to perform, prior to receiving the request from the user to access the enterprise network system, issuing the first unique credentials to the user.

11. The computer of claim 9, wherein the computer-readable instructions further cause the computer to perform:
transmitting a client application from the server to a client device associated with the user, wherein the client application is used by the server to control the client device, during the session.

12. The computer of claim 9, wherein dynamically modifying the respective unique services credentials associated with the user comprises modifying the respective unique services credentials associated with the user prior to terminating the connection between the server and the selected one of the plurality of services.

13. The computer of claim 9, wherein dynamically modifying the respective unique services credentials associated with the user comprises modifying the respective unique services credentials associated with the user periodically, according to a predetermined period of time.

14. The computer of claim 9, wherein dynamically modifying the respective unique services credentials associated with the user comprises requesting, by the server, new respective unique services credentials associated with the user.

15. The computer of claim 9, wherein dynamically modifying the respective unique credentials associated with the user comprises modifying, from the server, the respective unique services credentials to establish new respective unique services credentials associated with the user.

16. The computer of claim 9, wherein dynamically modifying the respective unique credentials associated with the user comprises determining new respective unique credentials associated with the user and further comprising, and wherein the computer-readable instructions further cause the computer to perform:
receiving, from the user, a second selection of the one of the plurality of services;
establishing a second connection between the server and the selected one of the plurality of services, using the new respective unique services credentials associated with the user;
providing the user with access to the selected one of the plurality of services during a second session, through the second connection between the server and the selected one of the plurality of services; and
dynamically modifying the new respective unique services credentials associated with the user, after the second session is finished.

17. A computer program product comprising:
a computer-readable storage medium having computer-readable program code embodied therewith, the computer-readable program code comprising:
computer-readable program code configured to receive, at a server, a request from a user to access an enterprise network system;
computer-readable program code configured to authenticate the user at the server, by receiving first unique credentials from the user;

computer-readable program code configured to facilitate the user's access to a plurality of services external to the enterprise network system, in response to receiving the first unique credentials from the user, wherein each of the plurality of services requires respective unique services credentials associated with the user, to access a respective unique account associated with the user;

computer-readable program code configured to receive, from the user, a selection of one of the plurality of services;

computer-readable program code configured to determine the respective unique services credentials associated with the user, for the selected one of the plurality of services;

computer-readable program code configured to establish a connection between the server and the selected one of the plurality of services, using the respective unique services credentials associated with the user;

computer-readable program code configured to provide the user with access to the selected one of the plurality of services during a first session, through the connection between the server and the selected one of the plurality of services; and computer-readable program code configured to dynamically modify the respective unique services credentials associated with the user, after the first session is finished.

18. The computer program product of claim 17, wherein dynamically modifying the respective unique services credentials associated with the user comprises modifying the respective unique services credentials associated with the user prior to terminating the connection between the server and the selected one of the plurality of services.

19. The computer of claim 17, wherein dynamically modifying the respective unique services credentials associated with the user comprises modifying the respective unique services credentials associated with the user periodically, according to a predetermined period of time.

20. The computer of claim 17, wherein dynamically modifying the respective unique services credentials associated with the user comprises requesting, by the server, new respective unique services credentials associated with the user.

* * * * *